Oct. 23, 1956　　　　　　L. BLOK　　　2,768,270
HIGH-FREQUENCY DEVICE FOR DIELECTRIC HEATING
Filed May 11, 1953

INVENTOR
LOURENS BLOK
BY
AGENT

United States Patent Office 2,768,270
Patented Oct. 23, 1956

2,768,270
HIGH-FREQUENCY DEVICE FOR DIELECTRIC HEATING

Lourens Blok, Eindhoven, Netherlands, assignor to Hartford National Bank and Trust Company, Hartford, Conn., as trustee Application May 11, 1953, Serial No. 354,343

Claims priority, application Netherlands May 15, 1952

1 Claim. (Cl. 219—10.77)

The present invention relates to a high frequency device for dielectric heating.

For dielectric heating high-frequency devices have been proposed which comprise a back-coupled grid-controlled electron-tube oscillator and a tuned circuit which is provided between the anode and the control grid and comprises a circuit coil connected in series with the load circuit with load capacitor and an adjustable circuit capacitor placed between the anode and the control grid for controlling the power supplied, for example, as described in my U. S. Patent application Serial No. 308,848, filed September 10, 1952. The back-coupling voltage for the electron-tube oscillator is taken from a capacitative voltage divider which is connected in parallel with the circuit capacitor and whose tapping point is connected to the cathode of the tube.

Such a high-frequency device has the advantage that the power supplied to the load is variable within wide limits, so that said high frequency device is particularly suitable for the dielectric heating of workpieces of different nature and size.

In accordance with the invention the use of high-frequency devices of the aforesaid type is extended by making provision that the voltage divider capacitor connected between the anode and the cathode is constituted by the anode of the tube and a shell or hood made from conductive material and surrounding the anode.

The step in accordance with the invention permits the power control to be further widened.

Figure 1:
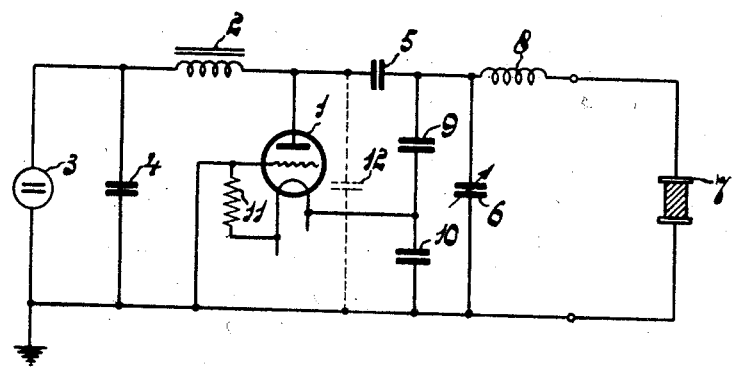
Figure 2:
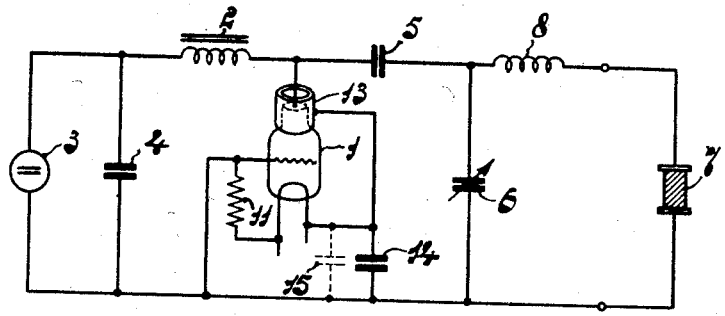

In order that the invention may be readily carried into effect it will now be described with reference to the accompanying drawing, given by way of example, in which:

Fig. 1 is a schematic diagram of a high-frequency device of the type referred to; and Fig. 2 is a schematic diagram of a preferred embodiment of the high-frequency device of the present invention.

In the high-frequency device shown in Fig. 1, the high-frequency heating energy is taken from a grid-controlled electron-tube oscillator comprising a triode 1, which is connected through a supply choke 2 to a direct voltage source 3 with a smoothing capacitor 4. The anode of the triode 1 is connected by way of a coupling capacitor 5 to a tuned anode circuit, comprising an adjustable circuit capacitor 6, placed between the anode and the control-grid, and a circuit coil 8 connected in series with a load capacitor 7. The back-coupling voltage of the oscillator, which is a Colpitts-circuit, is taken from a capacitative voltage divider which is connected in parallel with the circuit capacitor 6 and comprises the series-connection of capacitors 9 and 10 whose junction point is connected to the cathode of the tube 1. The control-grid of the tube is connected in a known manner through a grid-resistor 11 to the cathode of the tube.

In the circuit as shown the power delivered to the load is adjustable within wide limits (control range 1:10 for example) by means of a variable capacitor 6, the limits of the control range being mainly determined by the maximum and minimum circuit capacity. For a large control range it is consequently advantageous to construct the high frequency device such that the minimum circuit capacity, zero capacity, is extremely low.

In accordance with the invention, the control range of the power control is considerably widened in a particular simple manner by making provision that the voltage divider capacitor connected between the anode and the cathode is constituted by the anode of the tube and a cap or shell of conductive material surrounding the anode.

It has been found in practice that in the circuit-arrangement shown in Fig. 1 the control range of the power control is greatly limited by the capacity 12, indicated in broken lines, of the anode of the tube relative to ground, which capacity contributes a great deal to the minimum circuit capacity.

Fig. 2 is a schematic diagram of a preferred embodiment of the circuit-arrangement of the present invention. The corresponding parts of Fig. 2 bear the same reference numerals as those of Fig. 1.

In Fig. 2 the anode of the triode 1 is surrounded by an annular shell 13, for example of red copper. By giving said shell suitable proportions the voltage divider capacitor between the anode and the cathode has the desired value.

Due to the shielding action of the annular shell, the undue anode-to-ground capacity 12 shown in Fig. 1 is replaced by the capacity 15 of the shell relative to ground, which, as shown in the drawing, is connected in parallel with a voltage divider capacitor 14 connected between the cathode and the control grid. However, the shell capacity 15 does not limit the control range of the power control, since the voltage-divider capacitor 14 may now be made smaller than in Fig. 1. The step in accordance with the invention permits the power control to be widened by 50%, thus obtaining a considerable widening of the control range in a particular simple manner, without detracting from the efficiency of the circuit-arrangement.

Finally, it is pointed out that it may sometimes be desirable to stabilize the control-grid excitation to the effect that the oscillator tube invariably operates under optimum conditions. Excitation control may advantageously be effected by adjusting the voltage divider capacitor 14 in accordance with the grid direct current produced in the tube, for example in the manner as described in co-pending U. S. patent application Serial No. 281,642, filed April 10, 1952.

It is to be understood that the invention is not limited to the details disclosed but includes all such variations and modifications as fall within the spirit of the invention and the scope of the appended claim.

What is claimed is:

A high-frequency device for dielectric heating comprising an electron discharge device having an anode, a cathode and a control grid, a coil, electrodes forming a load capacitance and connected in series with said coil, a variable capacitor connected across said series-connected coil and capacitance and forming therewith a tuned circuit, means coupling said capacitor between said anode and said grid, a capacitance voltage divider connected across said capacitor and having a tap connected to said cathode, said divider having a capacitor connected between said anode and said cathode constituted by the anode of said device and a shell of conductive material, said shell surrounding said anode and electrostatically shielding the same against ground, and means to apply an operating potential between said anode and said cathode whereby high-frequency oscillations are produced in said tuned circuit.

(References on following page)

References Cited in the file of this patent

UNITED STATES PATENTS

| | | |
|---|---|---|
| 1,862,930 | Gebhard et al. | June 14, 1932 |
| 1,885,632 | Schelleng | Nov. 1, 1932 |
| 2,333,760 | Babo et al. | Nov. 9, 1943 |
| 2,355,887 | Moule | Aug. 15, 1944 |
| 2,439,286 | Crosby | Apr. 6, 1948 |
| 2,485,658 | Robertson | Oct. 25, 1949 |
| 2,628,328 | Scullin | Feb. 10, 1953 |